May 14, 1963 O. DITTRICH ETAL 3,089,346
SIDE BAR·LINK CHAIN
Filed Aug. 3, 1961 2 Sheets-Sheet 1
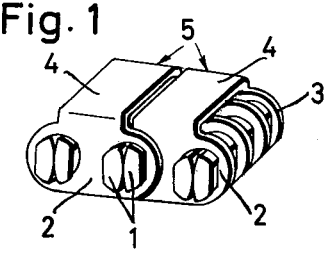
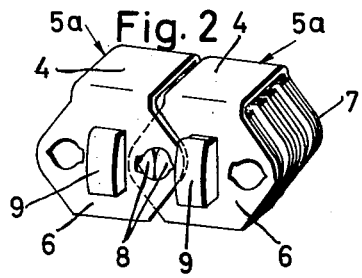
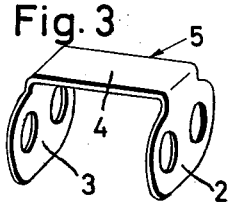
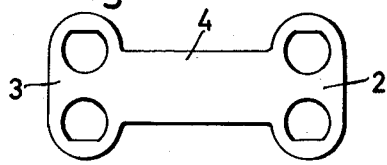
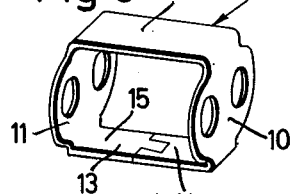
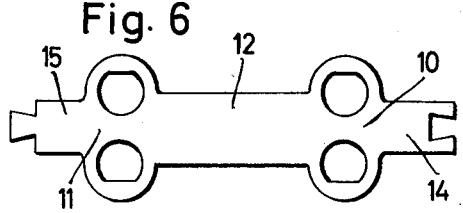
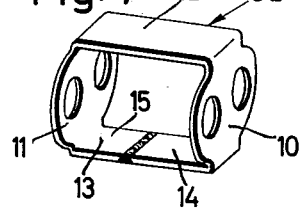
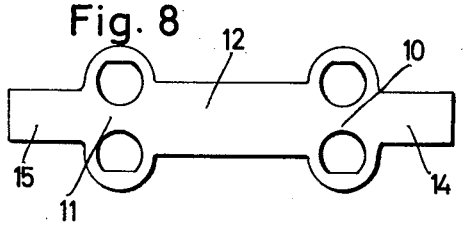
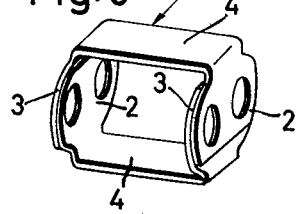
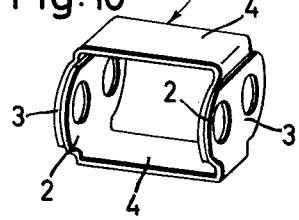
INVENTORS
Otto Dittrich
Herbert Steuer
BY Bailey, Stephens Huettig
ATTORNEYS

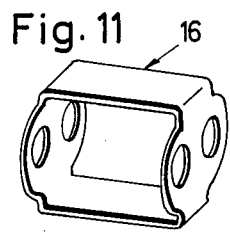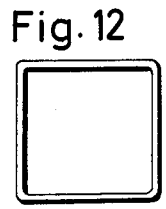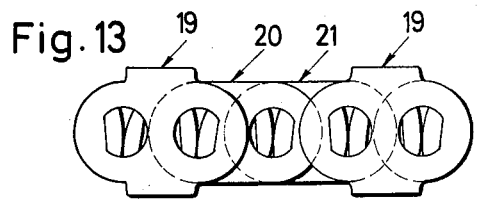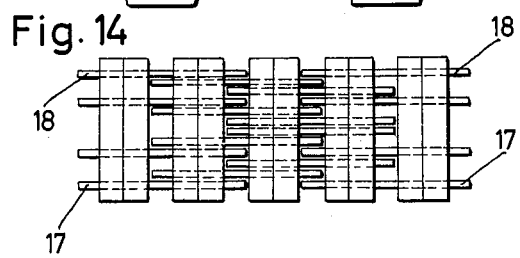

United States Patent Office 3,089,346
Patented May 14, 1963

3,089,346
SIDE BAR LINK CHAIN
Otto Dittrich and Herbert Steuer, Bad Homburg v.d. Hohe, Germany, assignors to Reimers Getriebe K.G., Ascona, Switzerland, a firm
Filed Aug. 3, 1961, Ser. No. 129,156
Claims priority, application Germany Sept. 2, 1960
13 Claims. (Cl. 74—236)

The present invention relates to a side bar link chain for an infinitely variable cone pulley transmission in which the adjacent links, each of which consists of an assembly of fishplates, are pivotally connected to each other and are provided with pressure members for transmitting the frictional forces from the conical pulley disks to the chain and vice versa.

Aside from such side bar link chains there are other chains known for the same purpose, the individual links of which are not assembled of a plurality of plates but consist of a single piece. A solid central part then has connecting arms thereon which are produced by milling and which are provided with transverse bores for receiving the link pins. Such one-piece chain links are, however, extremely expensive because of the great amount of material required for producing them and because of the amount of labor required for cutting out the connecting arms. The known link chains made of assemblies of fishplates may, on the other hand, be inexpensively manufactured by stamping. The individual packs of fishplates forming each chain link of these known chains are, however, not sufficiently resistant to tangential and torsional stresses, which is especially of disadvantage when such a chain is used in a gear which is subjected to high loads, since the chain is then acted upon by very high tangential and torsional stresses. Because of the resulting wear in the link joints, such chains soon lose their original stability against tangential and torsional stresses, which, in turn, results in further increased wear in the link joints. This, in turn, further reduces the stability of the chain against tangential and torsional stresses, with the result that the chain becomes worthless after a relatively short period of use.

It is an object of the present invention to overcome this common and very undesirable disadvantage of the known side bar link chains without, however, losing their advantages which result from their simple and inexpensive method of production.

This object is attained according to the invention by combining the two outer plates of at least some of the chain links by means of at least one connecting strap so as to form a frame which encloses the inner fishplates and is capable of resisting considerable tangential and torsional stresses. It is especially of advantage if the two outer plates of each chain link are secured to each other by two connecting straps so as to form a complete frame.

The half-frames are preferably made by being stamped out of a flat piece of material, the central part of which forms the connecting strap, while the two wider ends are bent over and then form the outer plates.

In a similar manner it is also possible to make a complete frame from a stamped piece of flat material, the central part of which then likewise forms one connecting strap and the two wider adjoining parts of which are bent over to form the two outer plates, while the narrower extensions thereof are bent over toward each other to form the second connecting strap. These two portions of the second strap may then be interconnected with each other or integrally secured to each other.

Another possibility of producing a complete frame consists in assembling it of two half-frames, each of which is made of a stamped piece of material as previously described, the central part of which forms the connecting strap, while the two outer ends are bent over to form the outer plates. The two half-frames are then combined with each other so that the outer plates of both half-frames are superimposed upon each other and may thereafter be secured to each other, for example, by spot welding.

The complete frames may, however, also be produced of a single piece of material by being stamped out of an integral rectangular tube.

It has further been found to be very advantageous to connect the two outer plates of every third chain link by at least one connecting strap to form a frame which is capable of resisting tangential and torsional stresses, while the fishplates of the two intermediate chain links are offset relative to each other so as to interengage with each other several times. This chain construction has the advantage that the adjacent links will be very closely spaced from each other.

The aforementioned objects, features and advantages of the present invention will become more clearly apparent from the following detailed description thereof, particularly when the same is read with reference to the accompanying drawings, in which—

FIGURE 1 shows a perspective view of two adjacent chain links of a chain according to the invention;

FIGURE 2 shows a perspective view of two adjacent chain links of a chain according to a modification of the invention;

FIGURE 3 shows a perspective view of a half-frame for a chain link according to FIGURE 1 which consists of two outer plates and a strap connecting the same;

FIGURE 4 shows the development of the half-frame according to FIGURE 3;

FIGURE 5 shows a perspective view of a complete frame for a chain link according to the invention;

FIGURE 6 shows the development of the complete frame according to FIGURE 5;

FIGURE 7 shows a perspective view of a complete frame according to a further modification of the invention;

FIGURE 8 shows the development of the complete frame according to FIGURE 7;

FIGURE 9 shows a perspective view of a complete frame which is composed of two half-frames similar to those as shown in FIGURE 3;

FIGURE 10 shows a perspective view of a modification of the complete frame as shown in FIGURE 9;

FIGURE 11 shows a perspective view of a further modification of a complete frame which is made of a rectangular tube;

FIGURE 12 shows a front view of the rectangular tube from which the complete frame according to FIGURE 11 is made;

FIGURE 13 shows a front view of several interconnected chain links of a chain according to a further modification of the invention; while FIGURE 14 shows a plan view of the links according to FIGURE 13.

Referring first to FIGURE 1 of the drawings, the individual links of the link chain according to the invention, which is intended for use in an infinitely variable cone pulley transmission are composed of an assembly of fishplates and are connected to each other by means of link pins, each of which consists of a pair of complementary half pins 1 which also serve as pressure members for transmitting the frictional forces from the conical disks of the cone pulleys to the chain and vice versa.

The outer plates 2 and 3 of the chain links according to FIGURE 1 are integrally connected by a strap 4 to form a half-frame 5, as shown in FIGURE 3, which is capable of taking up tangential and torsional stresses and is made of a stamped piece of material, as shown in FIGURE 4, the central part of which forms the strap 4, while the two outer parts form the two outer plates 2 and 3 after being bent at right angles to the central part.

In the modification of the chain links according to FIGURE 2, the outer plates 6 and 7 are likewise integrally connected by a strap 4 to form a half-frame 5a which is capable of taking up tangential and torsional stresses. However, contrary to the embodiment according to FIGURE 1, the half-pins 8 merely serve for connecting the adjacent chain links to each other, while for transmitting the frictional forces from the conical disks of the cone pulleys to the chain and vice versa separate pressure members 9 are provided which are arranged in openings in the outer plates and in corresponding openings intermediate fishplates.

In order to insure that the chain will bend only toward one side and for thus preventing the chain from being wrongly applied upon the pulleys, the connecting straps 4 of frames 5 and 5a according to FIGURES 1 and 2 are preferably spaced closely to each other so that, when the chain is bent in the direction toward these straps, they will abut against each other and thus prevent the chain links from pivoting relative to each other in this direction.

According to the embodiment of the invention as illustrated in FIGURE 5, the outer plates 10 and 11 are connected to each other by two straps 12 and 13 to form a complete frame 5b which is capable of resisting tangential and torsion forces. As shown in FIGURE 6, this complete frame 5b is made of a stamped piece of material, the central part of which between the parts forming the two outer plates 10 and 11 forms the strap 12, while each of these two parts for the outer plates carries on its outer side extensions 14 and 15, respectively. When these extensions 14 and 15 are bent at right angles to the two parts 10 and 11 and are connected to each other they form the second strap 13.

A further modification of the invention, which is similar to the embodiment according to FIGURES 5 and 6, is illustrated in FIGURES 7 and 8. In this case, the two bent parts 14 and 15 are integrally connected to each other, for example, by welding.

Each of FIGURES 9 and 10 shows a complete frame 5c which is composed of two half-frames similar to that shown in FIGURE 3. The two superimposed outer plates at each side of both complete frames are connected to each other, for example, by spot welding. The complete frame 5c according to FIGURE 9 is composed of two half-frames of different inner widths so that one half-frame fits over the other half-frame, while the complete frame according to FIGURE 10 is composed of two half-frames of the same inner width, and one outer plate of each half-frame engages with its inner side upon the outer side of one outer plate of the other half-frame.

FIGURE 11 shows a complete frame 16 which is made of an integral piece of material by being stamped out of a rectangular tube as shown in FIGURE 12 so that the straps are integrally connected with the outer fishplates.

In the further embodiment of the invention, as illustrated in FIGURES 13 and 14, only the outer plates 17 and 18 of chain links 19 are connected to each other by straps to form frames which are capable of taking up tangential and torsional stresses, while each of the intermediate chain links 20 and 21 consists of the usual assembly of fish-plates. In this embodiment of a link chain, the adjacent links are spaced at a very short distance from each other by interengaging with each other several times by being differently offset relative to each other.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A side bar link chain for an infinitely variable cone pulley transmission, comprising a plurality of chain links each including a plurality of intermediate fishplates and two outer fishplates, means positively connecting the outer fishplates of at least some of said links to form a frame around the intermediate fishplates capable of resisting tangential and torsional stresses, means hingedly connecting successive links, the fishplates of each link overlapping those of adjacent links, said last-mentioned connecting means engaging in the outer fishplates of successive links, and pressure members carried by each link outside the outer fishplates for transmitting frictional forces to and from the pulley cones to the chain.

2. A chain as claimed in claim 1 in which said outer plates have openings therein, and said hinged connecting means comprise pin means engaged in the openings of both plates.

3. A chain as claimed in claim 2 in which said pin means each comprises two half-pins rockingly engaging each other.

4. A chain as claimed in claim 2 in which said pressure members are integral with said pin means.

5. A chain as claimed in claim 2, in which said outer fishplates each have a further opening therethrough between the pin means openings, and said pressure members include parts mounted in said further openings.

6. A chain as claimed in claim 1 in which the means connecting the outer fishplates comprises at least one strap secured to both outer fishplates and extending therebetween across the chain.

7. A chain as claimed in claim 1 in which the means connecting the outer fishplates comprises two straps, one on either side of the chain, said straps being secured to both outer fishplates and extending therebetween across the chain.

8. A chain as claimed in claim 1 in which said outer fishplates and said outer fishplate connecting means are integrally formed of one piece of material.

9. A side bar link chain for an infinitely variable cone pulley transmission, comprising a plurality of chain links each including a plurality of intermediate fishplates, a single strap of metal having parts thereof intermediate the ends and the center forming two outer fishplates, the central portion forming a strap extending across one side of the chain and the end portions forming a strap across the other side of the chain to form a frame around the intermediate fishplates capable of resisting tangential and torsional stresses, means hingedly connecting successive links, the fishplates of each link overlapping those of adjacent links, said connecting means engaging in the outer fishplates of successive links, and pressure members carried by each link outside the outer fishplates for transmitting frictional forces to and from the pulley cones to the chain.

10. A chain as claimed in claim 9 in which the said end portions are secured together.

11. A chain as claimed in claim 1 in which the means connecting the outer fishplates comprises two straps, one on either side of the chain, integrally connected with the outer fishplates.

12. A side bar link chain for an infinitely variable cone pulley transmission, comprising a plurality of chain links each including a plurality of intermediate fishplates, and two outer fishplates at each edge of the chain, straps extending across the sides of the chain, each strap being integral with one of the fishplates at each edge of the chain to form interfitting channel-shaped members.

13. In a chain as claimed in claim 1, the intermediate fishplates being staggered lengthwise of the chain across at least three pairs of links.

References Cited in the file of this patent

UNITED STATES PATENTS

| | | |
|---|---|---|
| 2,690,678 | Bendall | Oct. 5, 1954 |
| 2,913,916 | Schmidt | Nov 24, 1959 |

FOREIGN PATENTS

| | | |
|---|---|---|
| 10,711 | Great Britain | Apr. 30, 1910 |